US009870758B2

(12) United States Patent
Finch et al.

(10) Patent No.: US 9,870,758 B2
(45) Date of Patent: Jan. 16, 2018

(54) APPARATUS FOR SIMULATING A DOOR LIGHT INSTALLED IN A DOOR

(71) Applicant: ODL, Incorporated, Zeeland, MI (US)

(72) Inventors: Roger Alan Finch, Watervliet, MI (US); James Michael Danielski, Grand Rapids, MI (US); David Kevin Faulkner, Grand Rapids, MI (US); Fred William Janssen, Grand Haven, MI (US)

(73) Assignee: ODL, Incorporated, Zeeland, MI (US)

( * ) Notice: Subject to any disclaimer, the term of this patent is extended or adjusted under 35 U.S.C. 154(b) by 385 days.

(21) Appl. No.: 14/504,716

(22) Filed: Oct. 2, 2014

(65) Prior Publication Data

US 2015/0191967 A1  Jul. 9, 2015

Related U.S. Application Data

(60) Provisional application No. 61/925,501, filed on Jan. 9, 2014.

(51) Int. Cl.
| | |
|---|---|
| *G06F 13/14* | (2006.01) |
| *G06F 3/147* | (2006.01) |
| *G09G 5/36* | (2006.01) |
| *E06B 7/30* | (2006.01) |
| *G09G 5/00* | (2006.01) |

(52) U.S. Cl.
CPC ............ *G09G 5/363* (2013.01); *E06B 7/30* (2013.01); *G06F 3/147* (2013.01); *G09G 5/00* (2013.01); *G09G 2380/06* (2013.01)

(58) Field of Classification Search
CPC .......... G09G 2320/10; G09G 2370/16; G09G 2340/045; G09G 5/08; B32B 3/26; E06B 2003/7044; G06T 2207/10088; G06T 2207/20056; G06T 7/0012; G06F 3/0238; G06F 3/04886; G06F 2203/04805
USPC ........................................................ 345/520
See application file for complete search history.

(56) References Cited

U.S. PATENT DOCUMENTS

| | | | |
|---|---|---|---|
| 2005/0044511 A1* | 2/2005 | Jong ..................... | G06F 3/147 715/865 |
| 2005/0056381 A1* | 3/2005 | Truman .................. | E06B 3/485 160/133 |
| 2008/0055240 A1* | 3/2008 | Zhang .................... | G06F 1/1601 345/156 |

(Continued)

*Primary Examiner* — Gregory J Tryder
*Assistant Examiner* — Kwang Lee
(74) *Attorney, Agent, or Firm* — Barnes & Thornburg LLP (57) ABSTRACT

An apparatus for simulating a door light includes a door defining a first opening therethrough, a frame unit engaging the door about the first opening, wherein the frame unit defines a second opening therethrough sized such that an overlay section of the frame unit, defined between the periphery of the first opening and a periphery of the second opening, partially overlays the first opening, and a display monitor received within the first opening and having a front surface engaging the overlay section about the second opening and defining a display screen surrounded by the frame unit with a periphery of the display screen terminating at or spaced-apart from the periphery of the second opening, the monitor further including an integral memory having instructions stored therein executable by an integral processor to control the display screen to display thereon an image or video of a door light.

14 Claims, 4 Drawing Sheets

(56) References Cited

U.S. PATENT DOCUMENTS

2009/0316056 A1* 12/2009 Rosencwaig ......... G06F 1/1601
348/836
2012/0062583 A1* 3/2012 Reynolds ............... G06Q 30/02
345/589

* cited by examiner

FIG. 7

APPARATUS FOR SIMULATING A DOOR LIGHT INSTALLED IN A DOOR

CROSS-REFERENCE TO RELATED APPLICATION

This patent application claims the benefit of, and priority to, U.S. Patent Application Ser. No. 61/925,501, filed Jan. 9, 2014, the disclosure of which is incorporated herein by reference in its entirety.

FIELD OF THE INVENTION

The present invention relates generally to visual display devices, and more specifically to such devices mounted to doors in place of door lights and controlled to display thereon images and/or video content of one or more door light designs.

BACKGROUND

Many conventional residential and commercial doors are manufactured with an opening sized to receive a door light, and others may be modified to define such an opening to receive a door light. In either case, many door light designs may be available for installation in the door, and companies offering such door lights typically make available to potential buyers one or more catalogs illustrating such door light designs installed in one or more doors. It may be desirable by potential buyers of door lights to be able to view a physical embodiment of a door with various door light options mounted thereto.

SUMMARY

The present invention may comprise one or more of the features recited in the attached claims, and/or one or more of the following features and combinations thereof. An apparatus for simulating a door light may comprise a door defining a first opening therethrough sized to receive a door light, a frame unit engaging the door about a periphery of the first opening, wherein the frame unit defines a second opening therethrough sized such that an overlay section of the frame unit, defined between the periphery of the first opening and a periphery of the second opening, partially overlays the first opening, and a display monitor received within the first opening and having a front surface engaging at least a portion of the overlay section about the second opening. The front surface of the display monitor may define a display screen surrounded by the frame unit with a periphery of the display screen terminating at or spaced-apart from the periphery of the second opening. The display monitor may include an integral processor and an integral memory having instructions stored therein that are executable by the processor to control the display screen to display thereon an image or video of a door light.

Another apparatus for simulating a door light may comprise a door defining a first opening therethrough sized to receive a door light, a frame unit engaging the door about a periphery of the first opening, wherein the frame unit defines a second opening therethrough sized such that an overlay section of the frame unit, defined between the periphery of the first opening and a periphery of the second opening, partially overlays the first opening, and a display monitor received within the first opening and having a front surface engaging at least a portion of the overlay section about the second opening. The front surface of the display monitor may define a display screen surrounded by the frame unit, and the display monitor may have an integral processor, an integral data interface electrically connected to the processor and an integral memory having instructions stored therein that are executable by the processor to control the display screen to display thereon an image or video of a door light received as a data file via the data interface.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

This disclosure is directed to a display apparatus in which a display monitor is mounted, in lieu of a door light, within a door light opening formed through a conventional door, and in which the display monitor includes an on-board processor and memory having instructions stored therein that are executable by the on-board processor to control a display screen of the display monitor to display thereon an image or video of a door light. The display monitor is illustratively sized or selected to have a display screen that has approximately the same dimensions as one or more door lights for which the door light opening is sized to accommodate so that door light images displayed on the display screen therefore have approximately the same dimensions as actual door lights that can be installed in the door. The display monitor is illustratively mounted to and within the door using at least one conventional frame unit surrounding the display screen so that door light images displayed on the display screen of the display monitor are framed by an actual door light frame.

One or more door light image or video data files are illustratively stored on an off-board, i.e., external, memory device, and the display monitor illustratively includes an on-board, i.e., integral, data interface that is connectable in data communications with the external memory device. The instructions stored in the memory on-board the display monitor include instructions that are executable by the on-board processor to access one of the one or more door light image or video data files stored on the off-board memory device for display on the display screen when the off-board memory device is connected in data communications with the data interface on-board the display monitor.

Figure 1:
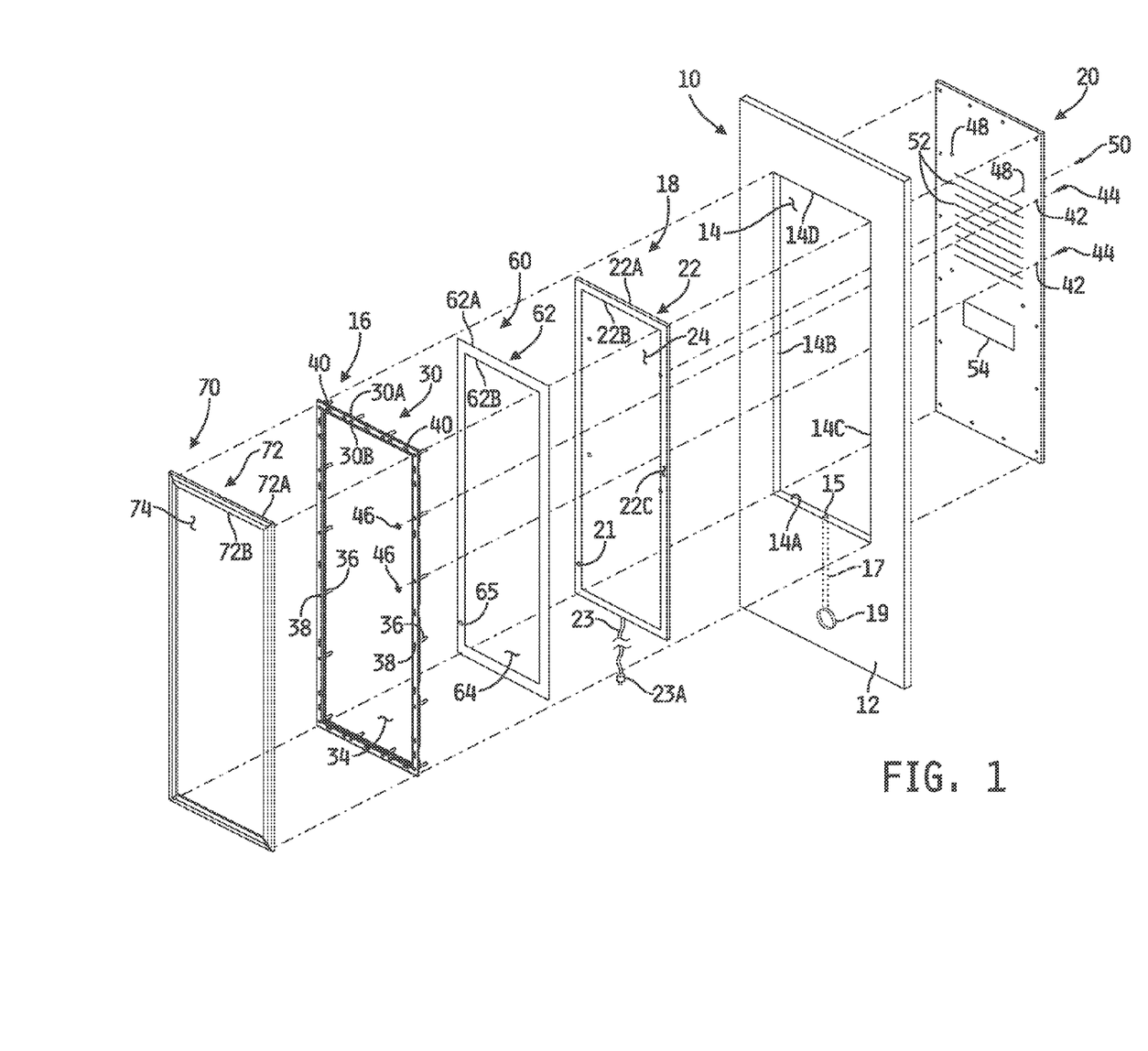
FIG. 1 is an exploded view of an embodiment of an apparatus for simulating a door light installed in a door.

Referring now to FIG. 1, an exploded view is shown of an embodiment of an apparatus 10 for simulating a door light installed in a door 12. The door 12 may be any conventional door designed to be installed in a residential or commercial application, or may alternatively be a mock door designed and fabricated for the purpose of display. In either case, the apparatus 10 may be used in any setting or location, e.g., for the purpose of demonstrating the appearance of one or more door light designs in the context of a commercially available door and door light frame combination. Example of doors 12 described in this disclosure may include, but should not be limited to, any type of interior or exterior door used in any residential and/or commercial application which includes one or more door lights of any design. In any case, the door 12 defines an opening 14 therethrough that is sized to receive a door light therein. In the illustrated embodiment, for example, the opening 14 is rectangular in shape having opposing and substantially parallel terminal faces 14A, 14D along bottom and top ends thereof respectively, and relatively longer opposing and substantially parallel terminal faces 14B, 14C along opposing sides. It will be understood, however, that the opening 14 may be any desired geometric shape to accommodate the shape of any desired door light configuration. In any case, the door 12 may be formed of any desired material or combination of materials, and the opening 14 may be formed during the construction or fabrication of the door 12 or following construction/fabrication of the door using conventional techniques.

The apparatus 10 further includes a frame unit 16 that is sized to engage the door 12 about the opening 14, e.g., on one major surface or side of the door 12, a display monitor 18 that is sized to be received within the opening 14, and another frame unit 20 that is sized to also engage the door 12 about the opening 14, e.g., on another major surface or side of the door 12 that is opposite to the major surface or side that the frame unit 16 engages. In the embodiments illustrated and described herein, the display monitor 18 is positioned within the opening 14, and the frame units 16, 20 are secured to each other through the opening 14 in a manner that clamps each to a corresponding major surface of the door 12 about the opening 14 with the display monitor 18 trapped between the two frame units 16, 20.

Illustratively, the frame unit 16 includes a conventional inner frame unit 30 that is configured to be secured to the frame unit 20 as described briefly above, and a conventional cover frame 70 that is configured to be secured to and over the inner frame 30. The cover frame 70 illustratively has an exterior surface, i.e., a surface that faces away from the inner frame 30, configured to have or include any desired shape(s) and/or contour(s) to thereby provide for a finished appearance of the frame unit 16.

In some embodiments, as will be described in further detail hereinafter, a template 60 may be included to provide a border area between the inner periphery of the frame unit 16 and a periphery of the display screen 24 carried by the display monitor 18. Alternatively or additionally, the template 60 may be included to provide a border area between the inner periphery of the frame unit 16 and a periphery of an image or video of a door light displayed on the display screen 24 of the display monitor 18 in embodiments in which the periphery of the image or video of the door light displayed on the display screen 24 is geometrically different than that of the inner periphery of the frame unit 16 and/or in embodiments in which the periphery of the image or video of the door light displayed on the display screen 24 does not extend fully to the periphery of the display screen 24.

In the embodiment illustrated in FIG. 1, the display monitor 18 illustratively includes a frame member 22 which surrounds and frames the display screen 24. The frame member 22 has an outer periphery 22A and an inner periphery 22B which forms a border region 22C therebetween. The outer periphery 22A of the frame member 22 defines a periphery of the front surface of the display monitor 18 which is defined by the combined areas of the display screen 24 and the border area formed between the outer and inner peripheries 22A, 22B of the frame member 22. The display monitor 18 is illustratively selected to have an outer periphery 22A that is slightly smaller than the periphery of the opening 14 defined through the door 12 so that the display monitor 18 can be received within the opening 14 and the frame unit 16 can be secured to the frame unit 20 about the display monitor 18 without engaging or contacting the frame member 22.

Figure 3:
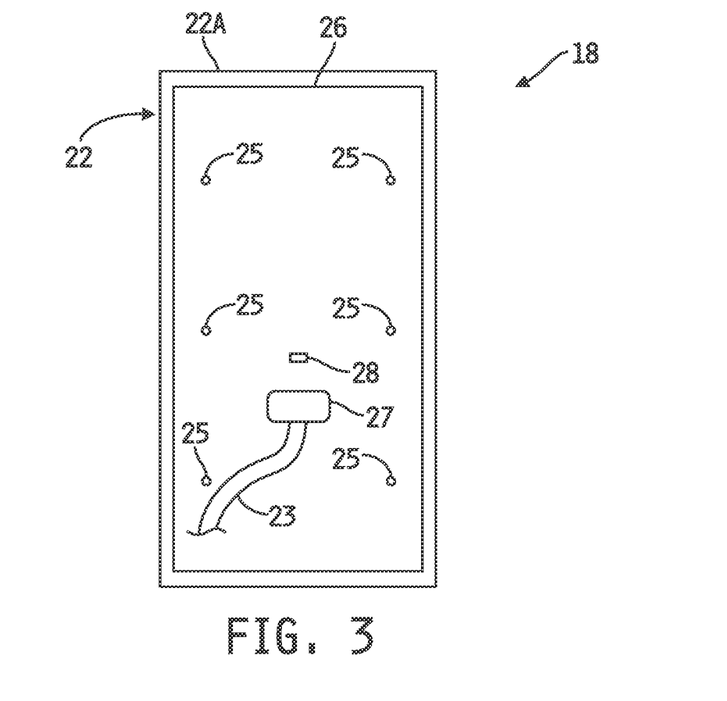
FIG. 3 is a simplified plan view of the back side of the display monitor illustrated in FIG. 1.

Referring now to FIG. 3, a simplified plan view diagram of the rear or back of the display monitor 18 is shown. Illustratively, the frame member 22 surrounds a rear body portion 26 of the display monitor 18, and the rear body portion 26 includes an electrical power interface or receptacle 27 from which a power cable or cord 23 extends. The terminal end of the electrical power cable 23 is fixedly or detachably connected, electrically and mechanically, to the electrical interface or receptacle 27 of the display monitor 18, and a free end 23A of the power cable 23 defines a conventional electrical plug assembly. In one embodiment, as illustrated in FIG. 3, the rear body portion 26 of the display monitor further defines a number of fixation points or passageways 25, e.g., threaded bores. In embodiments in which the frame unit 20 is provided in the form of a panel, such as illustrated in FIG. 3, one or more of the fixation passageways 25 may be used to secure such a panel to the rear body portion 26 of the display monitor 18. As will be described in greater detail hereinafter, the display monitor 18 includes an integral data communications interface 28, and the embodiment illustrated in FIG. 3 is shown with one specific embodiment of such a data communications interface 28 provided in the form of an electrical interface or port configured to be electrically connected to a correspondingly configured electrical interface or port of a memory device or system external to the apparatus 10. In any case, Referring now to FIGS. 1 and 3, the door 12 is illustratively fabricated or modified to include an opening 15 in the bottom terminal face 14A of the opening 14. The opening 14 extends downwardly from the terminal face 14A through a bore or channel 17 to an exit opening 19 formed in, at or near the bottom edge of the door 12. In the embodiment illustrated in FIG. 1, for example, the exit opening 19 is formed through one major surface of the door, e.g., the major surface of the door 12 which engages the frame unit 20, although in other embodiments the exit opening may alternatively be formed at other locations of the major surface of the door 12 or in any other desired surface of the door 12. In any case, the opening 15, bore or channel 17 and exit opening 19 are illustratively sized to accommodate the electrical power cord 23 and free end 23A so that the electrical power cord 23 can be routed into the opening 15, through the bore or channel 17 and out of the exit opening 19 when the display monitor 18 is received in the opening 14 of the door 12. The free end 23A of the electrical power cord 23 may then be electrically connected to a suitable power source external to the apparatus 10 to provide electrical power to the display monitor in a conventional manner.

In one embodiment, the display monitor 18 is illustratively selected to have a width that is less than or equal to the width of the opening 14 formed through the door 12, wherein the width of the opening 14 is defined by the widths of the terminal faces 14A-14D of the opening, i.e., by the distance between the opposing major surfaces of the door 12 to which the frame units 16, 20 are clamped. In such embodiments, the display monitor 18 is completely contained, with the exception of the electrical power cord 23, within the boundaries of the opening 14 formed through the door 12. Alternatively, the display monitor 18 may be selected to have a greater width such that a portion of the rear body portion 26 extends outwardly from the opening 14, and in such embodiments the frame unit 20 will typically be modified to accommodate such a display monitor 18.

In a particular embodiment, the opening 14 is formed through a conventional 32-inch or 36-inch wide door 12, and is illustratively sized to be 23 inches×37 inches to accommodate a rectangularly-shaped insulated glass door light having dimensions of 22 inches×36 inches. In this embodiment, the display monitor 18 is illustratively an EPSTRSWD40 Digital Advertising Sign, having a 40-inch diagonal display screen 24 and having total physical dimensions of 36 inches×21 inches×1.5 inches, and commercially available via a number of on-line sources including, for example, www.displays2go.com. It will be understood, however, that in other embodiments, the opening 14 may have other dimensions and/or geometrical shapes, and/or other commercially available display monitors may be used as the display monitor 18.

Figure 2:
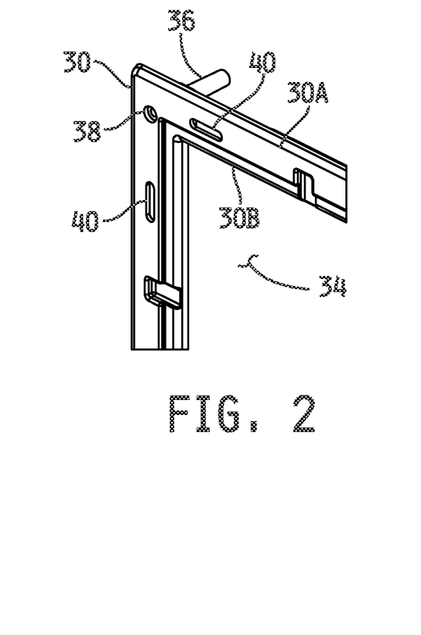
FIG. 2 is a perspective view of a portion an outer surface of the frame unit illustrated in FIG. 1.

Referring now to FIGS. 1 and 2, the frame unit 16 includes an inner frame unit 30 illustratively having the same general shape as that of the opening 14 defined through the door 12 and the inner frame unit 30 is sized to engage the door 12 about the opening 14. The inner frame unit 30 has an outer periphery 30A, and defines an opening 34 therethrough bounded by an inner periphery 30B of the inner frame unit 30. The outer periphery 30A is sized larger than that of the opening 14, and the inner periphery 30B is sized smaller than that of the opening 14. A portion of the frame unit 30 thus engages the door the door 12 about the periphery of the opening 14, and an overlay section of the frame unit 30, defined between the periphery of the opening 14 of the door 12 and the periphery of the opening 34, i.e., the inner periphery 30B, when the inner frame 30 engages the door as illustrate in FIG. 1, partially overlays the opening 14 defined through the door 12. A portion of the front surface of the display monitor 18, e.g., adjacent to the periphery of the frame member 22, engages a portion of the overlay section of the inner frame unit 30 when the display monitor 18 is received within the opening 14 and the inner frame unit 30 engages the door 12 as shown. A number of fixation passageways 36, 38 are defined at least partially bout and through the inner frame unit 30, and a number of openings, e.g., slotted openings 40 are likewise defined at least partially about the inner frame unit 30.

In the embodiment illustrated in FIG. 1, the frame unit 20 is illustratively provided in the form of a panel, although the frame unit 20 in other embodiments may alternatively be provided in the form of a frame unit similar to the inner frame unit 30 or other conventional frame configuration. In any case, the frame unit 20 illustratively has the same general shape as that of the opening 14 defined through the door 12, and as with the inner frame unit 30 the frame unit 20 has an outer periphery that is larger than that of the opening 14 such that the frame unit 20 is sized to engage the door 12 about the opening 14. A number of fixation passageways 42 are defined at least partially bout and through the frame unit 20, and the fixation passageways 42 generally align with the fixation passageways 36, 38 when the inner frame unit 30 engages the door 12 on one side and the frame unit 20 engages the door 12 on its opposite side. A number of fixation elements 44, e.g., threaded screws or bolts, are provided, and pass through some or all of the fixation passageways 42 and 36, 40, and a number of complementarily configured fixation elements 46, e.g., threaded bolts, are also provide and engage the fixation elements 44. With the display monitor 18 received and positioned within the opening 14 as described above, the inner frame unit 30 and frame unit 20 are brought into engagement with opposite sides of the door 12, and the fixation elements 44 are then passed through the aligned fixation passageways 42 and 36, 40 and into engagement with corresponding ones of the fixation elements 46. As the fixation elements 46 are advanced onto the fixation elements 44, or vice versa, the inner frame unit 30 is drawn toward and against one side of the door 12 and the frame unit 20 is likewise drawn toward and against the opposite side of the door 12 with the display monitor 18 trapped therebetween. As briefly described above, the display monitor 18 is selected to provide sufficient space between its periphery and the periphery of the opening 14 to allow the fixation elements 44 to pass through the opening 14 about the display monitor 18 without engaging or contacting the display monitor 18. In any case, the fixation elements 46 are advanced onto the fixation elements 44 until the frame units 30 and 20 are securely, e.g., non-movably, clamped to the door 12.

As shown in FIG. 3, the illustrated embodiment of the display monitor 18 defines a number of fixation openings 25, e.g., threaded passageways, extending into the rear body portion 26 thereof. In the embodiment illustrated in FIG. 1 in which the frame unit 20 is provided in the form of a panel, the panel 20 illustratively further defines a number of passageways 48 therethrough, and each such passageway 48 aligns with a corresponding one of the number of fixation openings 25 extending into the rear body 26 of the display monitor 18 when the display monitor 18 is positioned within the opening 14 of the door 12 and the panel 20 is appropriately positioned about the opening 14. A corresponding number of fixation elements 50, e.g., threaded screws or bolts, are illustratively provided and can be advanced into the passageways 48 and the fixation openings 25 to secure the panel 20 to the display monitor 18.

Figure 4:
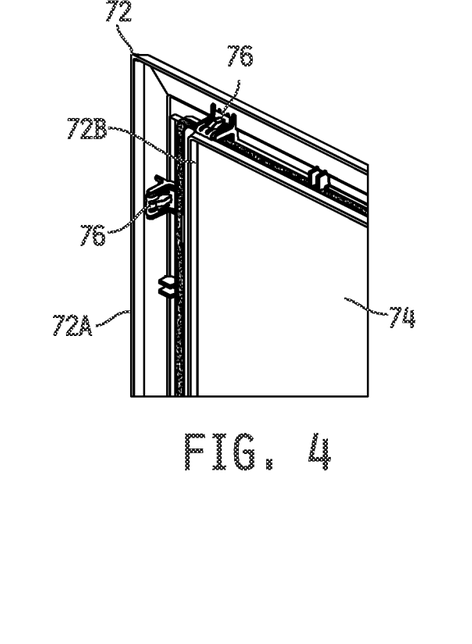
FIG. 4 is a perspective view of a portion of an inner surface of the cover frame illustrated in FIG. 1.

Referring now to FIGS. 1 and 4, the frame unit 16 also includes a cover frame unit 70 illustratively having the same general shape as that of the inner frame unit 30, and the cover frame unit is sized to cover and engage the inner frame unit 30. The cover frame unit 70 has an outer periphery 72A, and defines an opening 74 therethrough bounded by an inner periphery 72B of the cover frame unit 70. The outer periphery 72A is sized slightly larger than the outer periphery 30A of the inner frame unit 30, and the inner periphery 72B is sized slightly larger than the inner periphery 30B of the inner frame unit 30, and the cover frame unit 70 is accordingly sized to cover the inner frame unit 30. The inner surface of the cover frame unit 70, i.e., the surface of the cover frame unit 70 that faces and engages the inner frame unit 30, defines a number of projections 76 at least partially thereabout which align with, and are configured to be received within and engage, the slots 40 defined through the inner frame unit 30. The cover frame unit 70 is thus configured for snap-fit engagement to and with the inner frame unit 30.

In some embodiments, the display screen 24 is selected to have approximately the same dimensions as a door light which the opening 14 is sized to accommodate, such that the image or video of the door light displayed on the display screen 24 has approximately the same dimensions as an actual door light that can be displayed in the opening 14 and framed by at least the frame unit 16. In some embodiments, the display screen 24 extends substantially to the periphery of the display monitor 18, and in such embodiments the frame member 22 is thus omitted. In embodiments that include the frame member 22, the periphery of the display screen 24 is spaced apart inwardly from the periphery of the openings 34, 74 of the frame unit 16 by the width of the frame member 22, and in such embodiments the apparatus 10 may illustratively include a template 60 provided for the purpose of covering the frame member 22, e.g., with material that is color-matched with the cover frame 70. In such embodiments, the template 60 in provided in the form of a frame 62 having an outer periphery 62A, and the frame 62 defines an opening 64 therethrough bounded by an inner periphery 62B of the frame 62. The outer periphery 62A is sized slightly larger than that of the inner periphery 30B, 72B of the frame unit 16 so that a portion of the template frame 62 engages and is trapped between the inner frame unit 30 and the frame member 22 of the display unit. In embodiments in which the image or video of a door light displayed on the display screen 24 of the display monitor 18 extends to the periphery of the display screen 24, the inner periphery 62B is illustratively sized to terminate at the periphery of the display screen 24. In still other embodiments the image or video of the door light displayed on the display screen 24 of the display monitor 18 may not extend completely to the periphery of the display screen 24, or the image or video of the door light may not have the same geometric shape as that of the periphery of the display screen 24 such that one or more portions of the display screen 24 are not used to display the image or video of the door light, and in such embodiments the inner periphery 62B is illustratively sized to terminate at the outer periphery of the image or video displayed on the display screen 24 such that the template frame 62 overlays the portions of the video screen 24 not being used to display the door light image or video.

In the illustrated embodiment in which the frame unit 20 is provided in the form of a panel, the panel 20 illustratively further defines a number of vent openings 52, e.g. slots, therethrough to provide for venting of air from within the opening 14. In embodiments in which the data communications interface 28 is provided in the form of an electrical connector or physical data port connection, the frame unit 20 may further define an access panel 54 for the purpose of accessing such an electrical connector or data port connection. Such an access panel 54 may or may not include a locking mechanism for prohibiting unauthorized access to the data communications interface 28.

Figure 5:
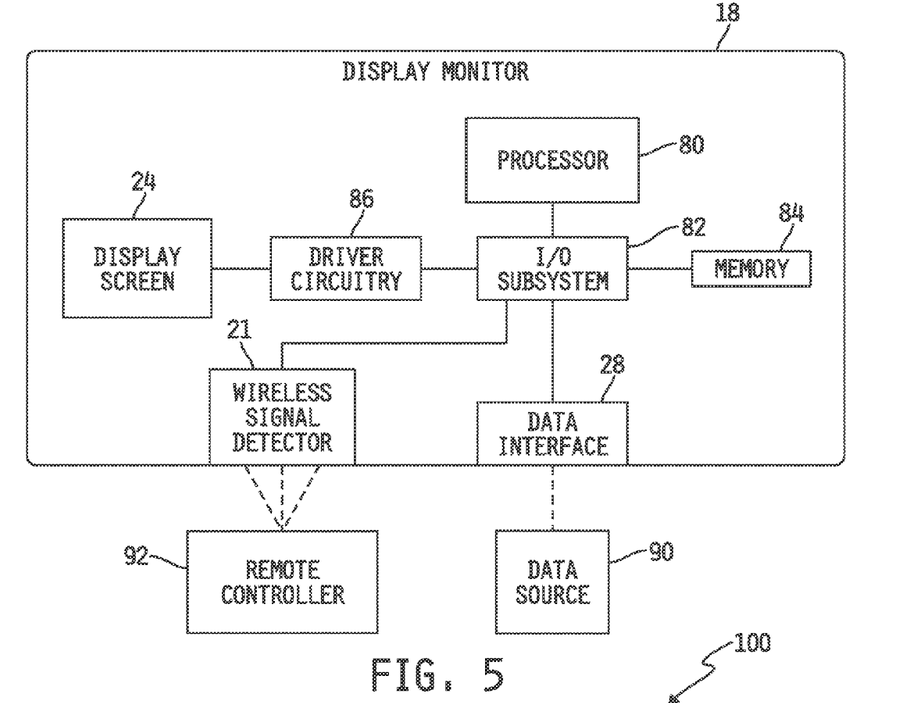
FIG. 5 is a simplified schematic diagram of some of the integral components of the display monitor and some additional electronic components included in the apparatus illustrated in FIG. 1.

Referring now to FIG. 5, a simplified schematic diagram is shown of some of the integral components of the display monitor 18 and also of some additional electronic components included in the apparatus 10 illustrated in FIG. 1. In the illustrated embodiment, the display monitor 18 includes a conventional processor 80 electrically connected to a conventional I/O subsystem 82. The I/O subsystem 82 is electrically connected to a conventional memory unit 84 and also to conventional driver circuitry 86 which is further electrically connected to the display screen 24. The memory 84 illustratively includes instructions stored therein that are executable by the processor 80 to control the driver circuitry 86 in a manner that controls the display of image and/or video content on the display screen 24. The I/O subsystem 82 is also electrically connected to the data communications interface 28 and, illustratively, to a wireless signal detector 21. In the embodiment illustrated in FIGS. 1, 3 and 5, each of the processor 80, I/O subsystem 82, memory unit 84, driver circuitry 86, display screen 24, data communications interface 28 and wireless signal detector 21 is integral with the display monitor 18; that is, each such component is encased within and/or carried by the display monitor 18 so that no such component need be added to the display monitor 18 prior to mounting the display monitor 18 to the door 12. External electrical components of the system 10, i.e., external to the display monitor 18, illustratively include a data source 90 and a remote controller 92.

In one embodiment, as illustrated by example in FIG. 3, the data communications interface 28 is provided in the form of a physical, electrical data connector or port. In some such embodiments the data source 90 is illustratively provided in the form of a portable memory device configured to be electrically connected to the data communications interface 28. Examples of physical data communication interface 28 and portable data source pairs 90 include, but should not be limited to, a conventional Universal Serial Bus (USB) connector port 28 and a corresponding conventional USB-based memory device including a USB connector, configured for mating connection to the USB connector port 28, and one or more memory circuits connected to the USB connector, e.g., a so-called "thumb drive," a conventional memory disk drive 28 and a corresponding conventional disk memory, e.g., optical, magnetic or other memory disk technology, or the like. In other embodiments in which the data communications interface 28 is provided in the form of a physical, electrical data connector or port, the data source 90 may be or include a conventional, remote memory device that is electrically connected to the data communications interface 28 via a conventional wiring system operating in accordance with a corresponding conventional communications protocol. Examples of such wiring systems and communication protocols may include, but should not be limited to, conventional ISA, ATA, SCSI, PCI, IEEE-1284, front-side bus, IEEE-488 or other parallel communication wiring/connection system, conventional RS-232, RS-422, RS-423, RS-485, SPI, USB, Firewire, Ethernet, SDI-12, serial SCSI, serial ATA, PCI Express, Fibre Channel, DE-9, 8P8C, 10P10C, or other serial communication wiring/connection system, or the like.

In other embodiments, the data communications interface 28 may be provided in the form of a wireless signal receiver or transceiver, and the data source 90 may be provided in the form of a co-located or remote wireless signal transmitter or transceiver connected in data communications with a conventional memory device or electronic system including one or more conventional memory devices. In such embodiments, the wireless signal receiver or transceiver 28 and the wireless signal transmitter or transceiver 90 may be configured to conduct data communications in accordance with any conventional wireless communications protocol. Examples of such wireless communication and wireless communication protocols may include, but should not be limited to, conventional radio frequency (RF) and corresponding RF communication protocol, e.g., LAN, WAN, Wi-Fi, Bluetooth®, short field, long range, or other conventional RF systems and/or communication protocols, conventional inductive communication systems, conventional microwave communication systems, conventional cellular telephone communication systems, and the like. In embodiments in which the data source is or includes a memory device 90 that is not a portable memory device, such a memory device may be provided in any conventional form including for example, but not limited to, a hard drive, a tape memory drive, a disk drive, or the like.

In any case, the data source 90 has stored therein or more image and/or video files each containing one or more door light images and/or door light videos, and the memory 84 illustratively has stored therein instructions that are executable by the processor 80 to access images or image files and/or videos or video files stored on the data source 90 and to control the display screen 24 to display thereon a corresponding image or video of a door light.

Referring again to FIG. 1, the display monitor 18 illustratively includes a wireless signal detector 21, e.g., in the form of an infrared detector attached to or otherwise positioned on the frame member 22. And in embodiments that include the template 60, the template frame 62 defines an opening 65 therethrough that aligns with the wireless signal detector 21 such that the wireless signal detector 21 may receive wireless control signals through the opening 65. In any case, the apparatus 10 includes a conventional remote controller 92 that is programmed to transmit, in a conventional manner, electronic control signals detectable or otherwise receivable by the wireless signal detector 21. In the illustrated embodiment, for example, the remote controller 92 illustratively includes an infrared transmitter, and the remote controller 92 is programmed to be responsive to manual commands initiated by selecting or depressing one or more buttons or switches on or carried by the remote controller 92 to transmit wireless control signals. Such wireless control signals are detected by the wireless signal detector 21, and these signals are provided to the processor 80 via the I/O subsystem 82. In this regard, the memory 84 has stored therein instructions that are executable by the processor 80 to control the display screen 24, in response to some such wireless control signals, to display thereon various menu screens and selectable menu choices, including the display of one, a set or a subset of door light images or video selections stored on the data source 90. The instructions store in the memory 84 further include instructions that are executable by the processor 80 to be responsive to others of the wireless control signals to import a selected image or image file, or a selected video or video file, of a door light from the data source 90, and to control the display screen 24 to display thereon the selected image or video of the door light.

Figure 6:
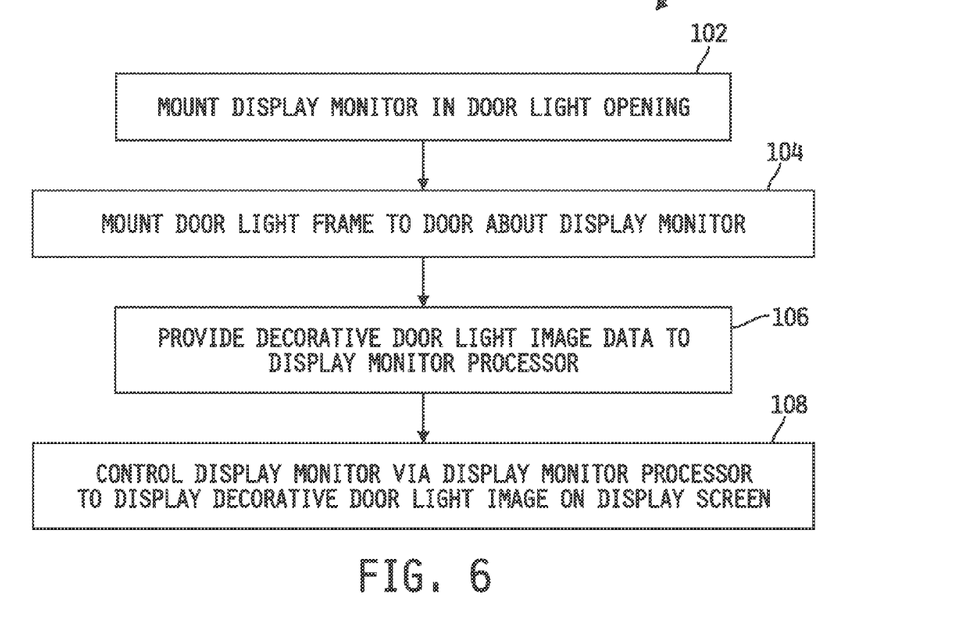
FIG. 6 is a simplified flow diagram of an embodiment of a process for assembling the apparatus illustrated in FIG. 1.
Figure 7:
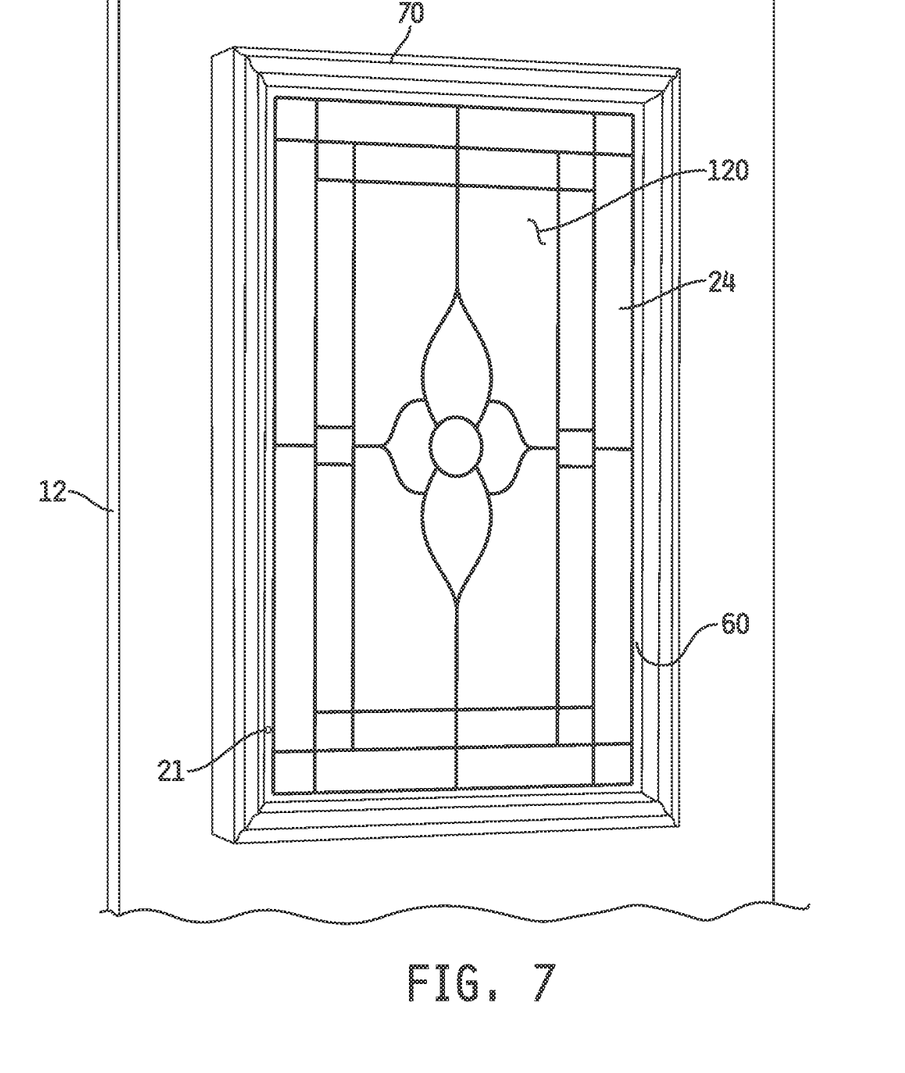
FIG. 7 is a perspective view of the apparatus of FIG. 1 assembled and displaying an image of an example door light design on the display screen of the display monitor.

Referring now to FIG. 6, a flowchart is shown of a simplified process 100 for assembling and operating the apparatus 10 illustrated in FIGS. 1-5. The process 100 begins at step 102 where the display monitor 18 is mounted or positioned within the opening 14 defined through the door 12, and thereafter at step 104 the door light frame 16, 20, 70 (and in some embodiments 60) is mounted to the door 12 about the opening 14 and about the display monitor 18, all as described in detail hereinabove. Thereafter at step 106, access to image (or video) data of a decorative door light is provided to the processor 80 on-board the display monitor 18, i.e., via the data communications interface 28 and data source 90. Thereafter at step 108, the processor 80 is operable to execute instructions stored in the memory 84 to control the display monitor 24 to display thereon the accessed, decorative door light image or video. Referring to FIG. 7, a front perspective view is shown of an example decorative door light image 120 displayed on the display screen 24 of the display monitor 18, which image 120 is framed by the door light frame 30, 70 (only the cover frame 70 visible in FIG. 7) and a template 60 through which the wireless signal detector 21 is visible.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. An apparatus for simulating a door light, comprising:
a door defining a first opening therethrough sized to receive and accommodate a door light therein,
a door light frame engaging the door about a periphery of the first opening, the door light frame defining a second opening therethrough sized such that an overlay section of the door light frame, defined between the periphery of the first opening through the door and a periphery of the second opening through the door light frame, partially overlays the first opening about the periphery thereof, and
a display monitor received within the first opening of the door in lieu of the door light and having a front surface engaging at least a portion of the overlay section of the door light frame about the periphery of the second opening, the front surface of the display monitor defining a display screen surrounded by the door light frame with an outer periphery of the display screen terminating at or spaced-apart from the periphery of the second opening through the door light frame, the display monitor including an integral processor and an integral memory having instructions stored therein that are executable by the processor to control the display screen to display thereon an image or video of a door light,
wherein the display screen has approximately the same dimensions as the door light for which the first opening is sized to accommodate such that the image or video of the door light displayed on the display screen has approximately the same dimensions as the door light.

2. The apparatus of claim 1 wherein the display monitor further includes an integral data interface electrically connected to the processor,
and wherein the apparatus further comprises a memory device, external to the display monitor, selectively connectable in data communications with the data interface of the display monitor, the memory device having stored therein the image or video of the door light,
and wherein the instructions stored in the memory further include instructions executable by the processor to control the display screen to display thereon the image or video of the door light by accessing the image or video of the door light via the memory device when the memory device is connected in data communications with the data interface of the display monitor, and to control the display screen to display thereon the accessed image or video of the door light.

3. The apparatus of claim 2 wherein the data interface comprises a universal serial bus (USB) port and the memory device comprises at least one memory circuit electrically connected to a USB connector configured to electrically connect to the USB port.

4. The apparatus of claim 2 wherein the data interface comprises a wired communication interface and the memory device comprises an external electronic device or system configured to transmit the image or video of the door light to the processor via a wired connection between the external electronic device or system and the wired communication interface.

5. The apparatus of claim 4 wherein the external device or system comprises one of a hard drive, a tape memory drive, a CD ROM drive and a disk drive.

6. The apparatus of claim 2 wherein the data interface comprises a wireless communication interface and the memory device comprises an external electronic device or system configured to wirelessly transmit the image or video of the door light to the processor via the wireless communication interface.

7. The apparatus of claim 1 further comprising a remote control device responsive to manual actuation to produce wireless control signals,
   wherein the display monitor further comprises a wireless signal detector electrically connected to the processor,
   and wherein the instructions stored in the memory further include instructions executable by the processor to process wireless control signals produced by the remote control unit and detected by the wireless signal detector to control the display screen to display thereon the image or video of a door light.

8. The apparatus of claim 7 wherein the instructions stored in the memory include instructions executable by the processor to process wireless control signals produced by the remote control unit and detected by the wireless signal detector to display a plurality of door light image or video selections on the display screen and to control the display screen to display thereon a selected one of the plurality of door light image or video selections.

9. The apparatus of claim 8 wherein the memory unit has the plurality of door light image or video selections stored therein.

10. The apparatus of claim 1, wherein the periphery of the display screen terminates inward of, and spaced apart from, the periphery of the second opening defined through the door light frame,
    and wherein the front surface of the display monitor includes a frame member extending about the display screen,
    and wherein the apparatus further comprises a template positioned between and engaging each of the door light frame and the frame member of the display monitor, the template defining a third opening therethrough having a periphery sized to terminate along the periphery of the display screen such that an overlay section of the template, defined between the periphery of the second opening through the door light frame and the periphery of the third opening through the template, overlays the portion of the frame member of the display monitor that extends inwardly from the second opening of the door light frame.

11. The apparatus of claim 1 wherein the door defines a fourth opening in a terminal surface of the first opening and extending downwardly from the first opening and defining an exit at or adjacent to a bottom edge of the door,
    and wherein the display monitor further includes an electrical power cord having a terminal end attached thereto and an opposite free end, the fourth opening sized to receive the electrical power cord therein when the display monitor is received within the first opening with the free end of the power cord extending out of the exit of the fourth opening.

12. The apparatus of claim 1, wherein the door light frame engages a first major surface of the door about the periphery of the first opening,
    and further comprising a second frame engaging a second major surface of the door, opposite the first major surface, about the periphery of the first opening, the second frame attached to the door light frame through the first opening of the door with the display monitor trapped within the first opening between the door light frame and the second frame.

13. The apparatus of claim 12, wherein the second frame comprises a panel,
    wherein the display monitor defines a rear surface opposite the front surface of the display monitor, the rear surface of the display monitor defining a plurality of mounting openings therein,
    and wherein the apparatus further comprises a plurality of fixation elements attaching the panel to the rear surface of the display monitor.

14. The apparatus of claim 1, wherein the door light frame comprises:
    an inner frame that engages the door about the periphery of the first opening and that defines the second opening therethrough, and
    a cover frame that engages the inner frame, the cover frame having an outer periphery that covers an outer periphery of the inner frame and an inner periphery that covers an inner periphery of the inner frame.

* * * * *